United States Patent Office 3,206,458
Patented Sept. 14, 1965

3,206,458
19-SUBSTITUTED PREGNENES
Albert Bowers, Mexico City, Mexico, assignor to Syntex Corporation, Panama, Panama, a corporation of Panama
No Drawing. Filed June 12, 1962, Ser. No. 201,765
14 Claims. (Cl. 260—239.55)

The present invention relates to novel cyclopentanophenanthrene derivatives and to a process for the production thereof.

More particularly, the present invention relates to novel 19-lower alkyl-19-hydroxy and 19-lower alkyl-19-keto-$\Delta^5$-pregnene-3$\beta$-ol derivatives.

The novel compounds of the present invention are represented by the following formulae:

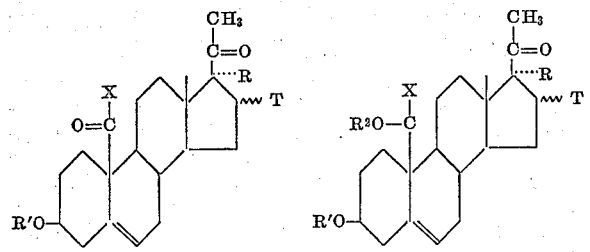

In the above formulae R represents hydrogen, hydroxyl or a hydrocarbon carboxylic acyloxy group of less than 12 carbon atoms; T represents hydrogen, $\alpha$-hydroxy, $\alpha$-acyloxy, $\alpha$-methyl or $\beta$-methyl; T and R together represent the group

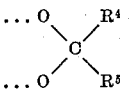

at the 16$\alpha$,17$\alpha$-position, wherein $R^4$ and $R^5$ each represents a lower alkyl group; X represents a lower alkyl group and $R^1$ and $R^2$ represent hydrogen or a hydrocarbon carboxylic acyl group of less than 12 carbon atoms.

The acyloxy and acyl groups are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and $\beta$-chloropropionate.

The compounds represented by the above formulae are powerful progestational agents with good oral activity. In addition they have anti-androgenic, anti-gonadotrophic and anti-estrogenic properties and are very useful in fertility control. Furthermore, they may be used in the treatment of premenstrual tension and exhibit blood cholesterol lowering and diuretic activities.

The novel compounds of the present invention are prepared by the process exemplified as follows:

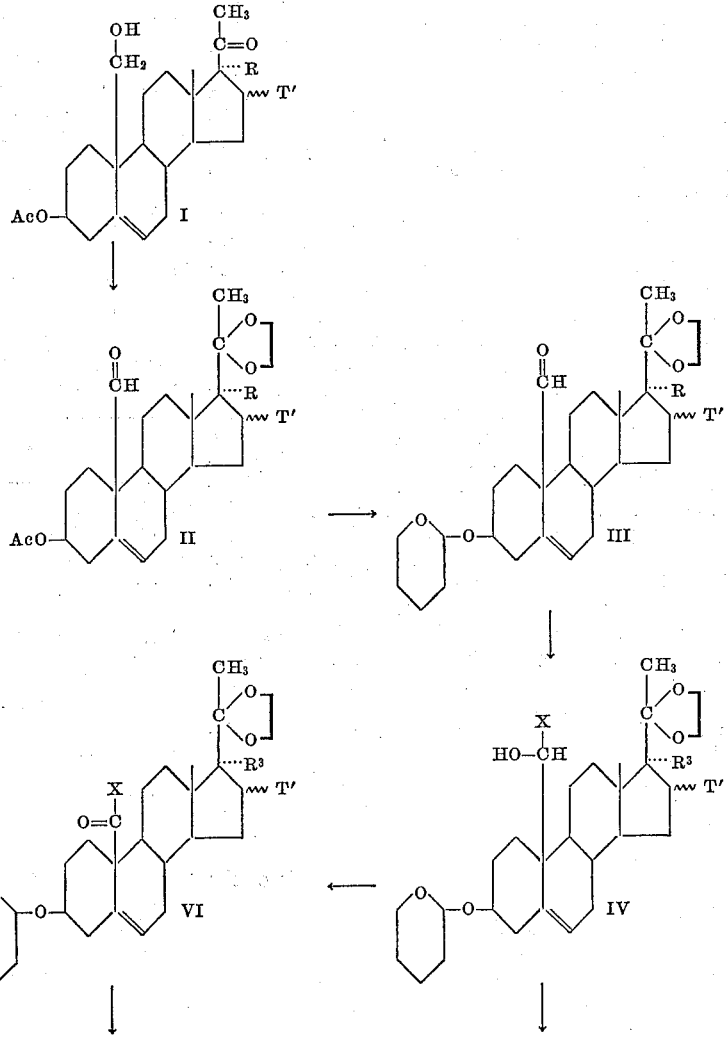

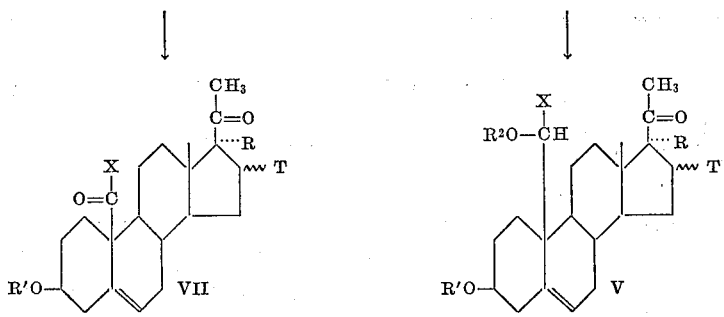

In the above formulae R, $R^1$, $R^2$, T and X have the same meaning as previously described; $R^3$ represents hydrogen or a hydroxyl group; $T^1$ may be hydrogen, α-methyl or β-methyl; R and $T^1$ together, and $R^3$ and $T^1$ together, each represent the group

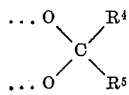

wherein $R^4$ and $R^5$ have the same meaning as set forth hereinbefore. Ac represents the acyl group of a hydrocarbon carboxylic acid of the type described hereinabove.

In practicing the process outlined above, the starting Compound I, which is a $\Delta^5$-pregnene-3β,19-diol-20-one, preferably the 3-acetate, is treated with ethylene glycol in the presence of p-toluenesulfonic acid, thus affording the 20-cycloethylenedioxy derivative of the corresponding compound. This 20-cycloethylenedioxy derivative is then oxidized, preferably with chromium trioxide in pyridine, thus affording the corresponding 20-cycloethylenedioxy-$\Delta^5$-pregnen-3β-ol-19-al acetate (II). The acetoxy group of the latter compound is hydrolyzed conventionally in a basic medium to afford the corresponding free 3β-alcohol, which upon reaction with dihydropyrane in the presence of p-toluenesulfonic acid under strictly anhydrous conditions, yields the 3-tetrahydropyranylether of the corresponding 20 - cycloethylenedioxy - $\Delta^5$-pregnen-3β-ol-19-al (III). The latter derivative, upon treatment with a lower alkyl magnesium halide such as methyl magnesium bromide or ethyl magnesium bromide, yields the 3-tetrahydropyranyl-ether of the corresponding 20-cycloethylenedioxy-19-lower alkyl-$\Delta^5$-pregnene-3β,19-diol (IV), with the hydrolysis of any existing acyloxy groups in the starting compound taking place concurrently, as for example, a 17α-acyloxy derivative is hydrolyzed to the 17α-hydroxyl compound. The free 19-hydroxyl group of the latter compound is oxidized, in a neutral or slightly basic medium, preferably with chromium trioxide in pyridine, to give the 3-tetrahydropyranylether of the corresponding 20-cycloethylenedioxy - 19-lower alkyl-$\Delta^5$-pregnen-3β-ol-19-one (VI). The 3-tetrahydropyranylether and 20-cycloethylenedioxy groupings of the 19-lower alkyl compounds described hereinbefore are conventionally hydrolyzed in an acid medium to give the corresponding 3β-hydroxy-20-keto-$\Delta^5$-pregnene derivatives (V, VII).

The compounds of the present invention having a 16α,17α,ketonide grouping yield the corresponding 16α,17α-diols by conventional treatment with a strong organic acid such as formic acid.

The second hydroxyl groups of the compounds described in the present invention such as the 3, 19 or 16-hydroxyl groups, are conventionally acylated in pyridine with an acylating agent such as an anhydride or a chloride of a hydrocarbon carboxylic acid of the type disclosed hereinbefore to give the corresponding acylates.

The tertiary hydroxyl group of the compounds of the present invention, namely, at C–17α, is conventionally esterified in the presence of p-toluenesulfonic acid with an acylating agent, as for example, acetic anhydride or caproic anhydride, thus affording the corresponding 17α-acyloxy derivatives.

The following specific examples serve to illustrate but are not intended to limit the scope of the present invention:

Example I

A mixture of 10 g. of 16β-methyl-$\Delta^5$-pregnene-3β,17α, 19-triol-20-one 3,17-diacetate (obtained in accordance with my U.S. patent application on Serial No. 194,717, filed May 14, 1962, now U.S. Patent No. 3,124,574 by reacting 16β-methyl-pregnenolone with acetic anhydride and p-toluenesulfonic acid to produce 3β,20-diacetoxy-16β-methyl-$\Delta^{5,17(20)}$-pregnadiene which upon peracid oxidation is converted into the 3β,20β-diacetoxy-16β-methyl-5α,6α,17α,20α-bis-oxido-pregnane. Upon treatment of the latter with dilute methanolic potassium hydroxide, there is formed the 16β-methyl-5α,6α-oxido-pregnane-3β,17α-diol-20-one 3-acetate which is reacted with zinc in acetic acid to form 16β-methyl-$\Delta^5$-pregnene-3β,17α-diol-20-one 3-acetate and further esterified with acetic anhydride to produce 16β-methyl-$\Delta^5$-pregnen-3β,17α-diol-20-one diacetate. The latter compound is converted into 16β-methyl-$\Delta^5$-pregnene-3β,17α,19-triol-20-one 3,17-diacetate by the method disclosed in my copending application Serial No. 194,716, filed May 14, 1962, now U.S. Patent No. 3,065,228), 250 cc. of dry benzene, 50 cc. of ethylene glycol and 500 mg. of p-toluenesulfonic acid monohydrate was refluxed for 16 hours using a water separator. It was then washed with a sodium bicarbonate solution, water and subsequently dried and evaporated to dryness. Recrystallization from acetone-hexane yielded 20-cycloethylenedioxy-16β-methyl-$\Delta^5$-pregnene-3β,17α,19-triol 3,17-diacetate (Compound No. 1).

Following the same procedure, the starting compounds listed under I (obtained in accordance with my U.S. patent application Ser. No. 194,716, filed May 14, 1962, now U.S. Patent No. 3,065,228) were converted into the corresponding compounds set forth under II.

| I | Cpd. No. | II |
|---|---|---|
| $\Delta^5$-pregnene-3β,19-diol-20-one 3-acetate. | 2 | 20-cycloethylenedioxy-$\Delta^5$-pregnene-3β,19-diol 3-acetate. |
| 16α-methyl-$\Delta^5$-pregnene-3β,19-diol-20-one 3-acetate. | 3 | 20-cycloethylenedioxy-16α-methyl-$\Delta^5$-pregnene-3β,19-diol 3-acetate. |
| 16β-methyl-$\Delta^5$-pregnene-3β,19-diol-20-one 3-acetate. | 4 | 20-cycloethylenedioxy-16β-methyl-$\Delta^5$-pregnene-3β,19-diol 3-acetate. |
| 16α,17α-isopropylidene-dioxy-$\Delta^5$-pregnene-3β,19-diol-20-one 3-acetate. | 5 | 16α,17α-isopropylidene-dioxy-20-cycloethylene-dioxy-$\Delta^5$-pregnene-3β,19-diol 3-acetate. |
| $\Delta^5$-pregnene-3β,17α,19-triol-20-one 3,17-diacetate. | 6 | 20-cycloethylenedioxy-$\Delta^5$-pregnene-3β,17α,19-triol 3,17-diacetate. |
| 16α-methyl-$\Delta^5$-pregnene-3β,17α, 19-triol-20-one 3,17-diacetate. | 7 | 20-cycloethylenedioxy-16α-methyl-$\Delta^5$-pregnene-3β,17α, 19-triol 3,17-diacetate. |

Example 2

A solution of 6 g. of 20-cycloethylenedioxy-16β-methyl-$\Delta^5$-pregnene-3β,17α,19-triol 3,17-diacetate (Compound No. 1) in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed with water, dried and evaporated to dryness. Crystallization from acetone-hexane afforded 20-cycloethylenedioxy-16β-methyl-Δ⁵-pregnene-3β,17α-diol-19-al diacetate (Cpd. No. 8).

The Compounds Nos. 2 to 7, inclusive, were treated in accordance with the above procedure, thus yielding respectively:

Cpd. No.—
9. 20-cycloethylenedioxy-Δ⁵-pregnen-3β-ol-19-al acetate
10. 20-cycloethylenedioxy-16α-methyl-Δ⁵-pregnen-3β-ol-19-al acetate
11. 20-cycloethylenedioxy-16β-methyl-Δ⁵-pregnen-3β-ol-19-al acetate
12. 20-cycloethylenedioxy-16α,17α-isopropylidenedioxy-Δ⁵-pregnen-3β-ol-19-al acetate
13. 20-cycloethylenedioxy-Δ⁵-pregnene-3β,17α-diol-19-al 3,17-diacetate
14. 20-cycloethylenedioxy-16α-methyl-Δ⁵-pregnene-3β,17α-diol-19-al 3,17-diacetate

Example 3

2 g. of Compound No. 8 was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 20-cycloethylenedioxy-16β-methyl-Δ⁵-pregnene-3β,17α-diol-19-al 17-acetate (Compound No. 15).

By the same procedure, the Compounds Nos. 9 to 14, inclusive, were respectively converted into:

Cpd. No.—
16. 20-cycloethylenedioxy-Δ⁵-pregnen-3β-ol-19-al
17. 20-cycloethylenedioxy-16α-methyl-Δ⁵-pregnen-3β-ol-19-al
18. 20-cycloethylenedioxy-16β-methyl-Δ⁵-pregnen-3β-ol-19-al
19. 20-cycloethylenedioxy-16α,17α-isopropylidenedioxy-Δ⁵-pregnen-3β-ol-19-al
20. 20-cycloethylenedioxy-Δ⁵-pregnene-3β,17α-diol-19-al 17-acetate
21. 20-cycloethylenedioxy-16α-methyl-Δ⁵-pregnene-3β,17α-diol-19-al 17-acetate

Example 4

2 cc. of dihydropyrane were added to a solution of 1 g. of 20-cycloethylenedioxy-16β-methyl-Δ⁵-pregnene-3β,17α-diol-19-al 17-acetate (Compound No. 15) in 15 cc. of benzene and about 1 cc. was distilled to remove moisture. 0.4 g. of p-toluenesulfonic acid were added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded the 3-tetrahydropyranylether of 20-cycloethylenedioxy-16β-methyl-Δ⁵-pregnene-3β,17α-diol-19-al 17-acetate (Cpd. No. 22).

The Compounds Nos. 16 to 21, inclusive, were treated in the same manner, thus affording respectively:

Cpd. No.—
23. The 3-tetrahydropyranylether of 20-cycloethylenedioxy-Δ⁵-pregnen-3β-ol-19-al
24. The 3-tetrahydropyranylether of 20-cycloethylenedioxy-16α-methyl-Δ⁵-pregnen-3β-ol-19-al
25. The 3-tetrahydropyranylether of 20-cycloethylenedioxy,16β-methyl-Δ⁵-pregnen-3β-ol-19-al
26. The 3-tetrahydropyranylether of 20-cycloethylenedioxy-16α,17α-isopropylidenedioxy-Δ⁵-pregnen-3β-ol-19-al Cpd. No.—Continued
27. The 3-tetrahydropyranylether of 20-cycloethylenedioxy-Δ⁵-pregnene-3β,17α-diol-19-al 17-acetate
28. The 3-tetrahydropyranylether of 20-cycloethylenedioxy-16α-methyl-Δ⁵-pregnene-3β,17α-diol-19-al 17-acetate

Example 5

A solution of 5 g. of Compound No. 22 in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded the 3-tetrahydropyranylether of 20-cycloethylenedioxy-16β,19-dimethyl-Δ⁵-pregnene-3β,17α,19-triol (Cpd. No. 29).

By the same procedure, the Compounds Nos. 23 to 28, inclusive, were converted respectively into:

Cpd. No.—
30. The 3-tetrahydropyranylether of 20-cycloethylenedioxy-19-methyl-Δ⁵-pregnene-3β,19-diol
31. The 3-tetrahydropyranylether of 20-cycloethylenedioxy-16α,19-dimethyl-Δ⁵-pregnene-3β,19-diol
32. The 3-tetrahydropyranylether of 20-cycloethylenedioxy-16β,19-dimethyl-Δ⁵-pregnene-3β,19-diol
33. The 3-tetrahydropyranylether of 20-cycloethylenedioxy-16α,17α-isopropylidenedioxy-19-methyl-Δ⁵-pregnene-3β,19-diol
34. The 3-tetrahydropyranylether of 20-cycloethylenedioxy-19-methyl-Δ⁵-pregnene-3β,17α,19-triol
35. The 3-tetrahydropyranylether of 20-cycloethylenedioxy-16α,19-dimethyl-Δ⁵-pregnene-3β,17α,19-triol

Example 6

The compounds Nos. 22 to 28, inclusive, were treated in accordance with Example 5, except that methyl magnesium bromide was substituted by ethyl magnesium bromide, thus affording respectively:

Cpd. No.—
36. The 3-tetrahydropyranylether of 20-cycloethylene-dioxy-16β-methyl-19-ethyl-Δ⁵-pregnene-3β,17α,19-triol
37. The 3-tetrahydropyranylether of 20-cycloethylene-dioxy-19-ethyl-Δ⁵-pregnene-3β,19-diol
38. The 3-tetrahydropyranylether of 20-cycloethylene-dioxy-16α-methyl-19-ethyl-Δ⁵-pregnene-3β,19-diol
39. The 3-tetrahydropyranylether of 20-cycloethylene-dioxy-16β-methyl-19-ethyl-Δ⁵-pregnene-3β,19-diol
40. The 3-tetrahydropyranylether of 20-cycloethylene-dioxy-16α,17α-isopropylidenedioxy-19-ethyl-Δ⁵-pregnene-3β,19-diol
41. The 3-tetrahydropyranylether of 20-cycloethylene-dioxy-19-ethyl-Δ⁵-pregnene-3β,17α,19-triol
42. The 3-tetrahydropyranylether of 20-cycloethylene-dioxy-16α-methyl-19-ethyl-Δ⁵-pregnene-3β,17α,19-triol

Example 7

The Compounds Nos. 29 to 42, inclusive, were treated in accordance with Example 2, thus affording respectively the following compounds:

Cpd. No.—
43. The 3-tetrahydropyranylether of 20-cycloethylene-dioxy-16β,19-dimethyl-Δ⁵-pregnene-3β,17α-diol-19-one
44. The 3-tetrahydropyranylether of 20-cycloethylene-dioxy-19-methyl-Δ⁵-pregnen-3β-ol-19-one Cpd. No.—Continued
45. The 3-tetrahydropyranylether of 20-cycloethylene-dioxy-16α,19 - dimethyl-Δ$^5$-pregnen-3β-ol-19-one
46. The 3-tetrahydropyranylether of 20-cycloethylene-dioxy-16β,19 - dimethyl-Δ$^5$-pregnen-3β-ol-19-one
47. The 3-tetrahydropyranylether of 20-cycloethylene - dioxy - 16α,17α - isopropylidenedioxy - 19-methyl-Δ$^5$-pregnen-3β-ol-19-one
48. The 3-tetrahydropyranylether of 20-cycloethylene - dioxy - 19 - methyl-Δ$^5$-pregnene-3β,17α,diol-19-one
49. The 3-tetrahydropyranylether of 20-cycloethylene - dioxy - 16α,19 - dimethyl - Δ$^5$ - pregnene-3β,17α-diol-19-one
50. The 3-tetrahydropyranylether of 20-cycloethylene - dioxy - 16β - methyl - 19 - ethyl - Δ$^5$ - pregnene-3β,17α-diol-19-one
51. The 3-tetrahydropyranylether of 20-cycloethylene-dioxy-19-ethyl-Δ$^5$-pregnen-3β-ol-19-one
52. The 3-tetrahydropyranylether of 20-cycloethylene - dioxy - 16α - methyl-19-ethyl-Δ$^5$-pregnen-3β-ol-19-one
53. The 3-tetrahydropyranylether of 20-cycloethylene-dioxy-16β-methyl - 19 - ethyl - Δ$^5$ - pregnen-3β-ol-19-one
54. The 3-tetrahydropyranylether of 20-cycloethylene-dioxy-16α,17α-isopropylidenedioxy - 19 - ethyl-Δ$^5$-pregnen-3β-ol-19-one
55. The 3-tetrahydropyranylether of 20-cycloethylene-dioxy-19-ethyl-Δ$^5$-pregnene - 3β,17α - diol - 19-one
56. The 3-tetrahydropyranylether of 20-cycloethylene-dioxy-16α-methyl - 19 - ethyl - Δ$^5$ - pregnene-3β,17α-diol-19-one

*Example 8*

A solution of 500 mg. of Compound No. 29 in 25 cc. of acetone was treated with 1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 16β,19-dimethyl-Δ$^5$-pregnene-3β,17α,19-triol-20-one (Cpd. No. 57).

The Compounds Nos. 30 to 56, inclusive, were treated following the same procedure, thus giving respectively:

Cpd. No.—
58. 19-methyl-Δ$^5$-pregnene-3β,19-diol-20-one
59. 16α,19-dimethyl-Δ$^5$-pregnene-3β,19-diol-20-one
60. 16β-19-dimethyl-Δ$^5$-pregnene-3β,19-diol-20-one
61. 16α,17α - isopropylidenedioxy - 19 - methyl - Δ$^5$-pregnene-3β,19-diol-20-one
62. 19-methyl-Δ$^5$-pregnene-3β,17α,19-triol-20-one
63. 16α,19-dimethyl - Δ$^5$ - pregnene-3β,17α,19-triol-20-one
64. 16β - methyl - 19 - ethyl-Δ$^5$-pregnene-3β,17α,19-triol-20-one
65. 19-ethyl-Δ$^5$-pregnene-3β,19-diol-20-one
66. 16α-methyl-19-ethyl-Δ$^5$-pregnene - 3β,19 - diol-20-one
67. 16β-methyl-19-ethyl - Δ$^5$ - pregnene - 3β,19-diol-20-one
68. 16α,17α-isopropylidenedioxy - 19 - ethyl - Δ$^5$-pregnene-3β,19-diol-20-one
69. 19-ethyl-Δ$^5$-pregnene-3β,17α,19-triol-20-one
70. 16α-methyl-19-ethyl-Δ$^5$-pregnene3β,17α,19 - triol-20-one
71. 16β,19-dimethyl - Δ$^5$ - pregnene - 3β,17α - diol-19,20-dione
72. 19-methyl-Δ$^5$-pregnen-3β-ol-19,20-dione
73. 16α,19-dimethyl-Δ$^5$-pregnen-3β-ol-19,20-dione
74. 16β,19-dimethyl-Δ$^5$-pregnen-3β-ol-19,20-dione Cpd. No.—Continued
75. 16α,17α - isopropylidenedioxy - 19 - methyl-Δ$^5$-pregnen-3β-ol-19,20-dione
76. 19-methyl-Δ$^5$-pregnene-3β,17α-diol-19,20-dione
77. 16α,19-dimethyl-Δ$^5$-pregnene-3β,17α-diol - 19,20-dione
78. 16β-methyl - 19 - ethyl-Δ$^5$-pregnene-3β,17α-diol-19,20-dione
79. 19-ethyl-Δ$^5$-pregnen-3β-ol-19,20-dione
80. 16α-methyl - 19 - ethyl-Δ$^5$-pregnen-3β-ol-19,20-dione
81. 16β - methyl - 19 - ethyl-Δ$^5$-pregnen-3β-ol-19,20-dione
82. 16α,17α - isopropylidenedioxy - 19 - ethyl - Δ$^5$-pregnen-3β-ol-19,20-dione
83. 19-ethyl-Δ$^5$-pregnene-3β,17α-diol-19,20-dione
84. 16α-methyl - 19 - ethyl-Δ$^5$-pregnene-3β,17α-diol-19,20-dione

*Example 9*

A mixture of 1 g. of 16β,19-dimethyl-Δ$^5$-pregnene-3β,17α,19-triol-.20-one (Cpd. No. 57), 4 cc. of pyridine and 2 cc. of acetic anhydride was kept at room temperature overnight, poured into ice water, the formed precipitate was filtered, washed with water and dried. Crystallization from acetone-hexane gave 16β,19-dimethyl-Δ$^5$-pregnene-3β,17α,19-triol-20-one 3,19-diacetate (Cpd. No. 85).

The Compounds Nos. 58 to 84, inclusive, were treated in the same manner, thus affording respectively:

Cpd. No.—
86. 19-methyl-Δ$^5$-pregnene-3β,19-diol-20-one diacetate
87. 16α,19 - dimethyl - Δ$^5$ - pregnene - 3β,19 - diol-20-one diacetate
88. 16β,19 - dimethyl - Δ$^5$ - pregnene - 3β,19 - diol-20-one diacetate
89. 16α,17α - isopropylidenedioxy - 19 - methyl - Δ$^5$-pregnene-3β,19-diol-20-one diacetate
90. 19 - methyl - Δ$^5$ - pregnene - 3β,17α,19 - triol - 20-one 3,19-diacetate
91. 16α,19 - dimethyl - Δ$^5$ - pregnene - 3β,17α,19-triol-20-one 3,19-diacetate
92. 16β - methyl - 19 - ethyl - Δ$^5$ - pregnene - 3β,17α,19-triol-20-one 3,19-diacetate
93. 19 - ethyl - Δ$^5$ - pregnene - 3β,19 - diol - 20 - one diacetate
94. 16α - methyl - 19 - ethyl - Δ$^5$ - pregnene - 3β,19-diol-20-one diacetate
95. 16β - methyl - 19 - ethyl - Δ$^5$ - pregnene - 3β,19-diol-20-one diacetate
96. 16α,17α - isopropylidenedioxy - 19 - ethyl - Δ$^5$-pregnene-3β,19-diol 20-one diacetate
97. 19 - ethyl - Δ$^5$ - pregnene - 3β,17α,19 - triol-20-one 3,19-diacetate
98. 16α - methyl - 19 - ethyl - Δ$^5$ - pregnene - 3β,17α,19-triol-20-one 3,19-diacetate
99. 16β,19 - dimethyl - Δ$^5$ - pregnene - 3β,17α-diol-19,20-dione 3-acetate
100. 19 - methyl - Δ$^5$ - pregnen - 3β - ol - 19,20-dione acetate
101. 16α,19 - dimethyl - Δ$^5$ - pregnene - 3β - ol 19,20-dione acetate
102. 16β,19 - dimethyl - Δ$^5$ - pregnen - 3β - ol-19,20-dione acetate
103. 16α,17α - isopropylidenedioxy - 19 - methyl-Δ$^5$-pregnen-3β-ol 19,20-dione acetate
104. 19 - methyl - Δ$^5$ - pregnene - 3β,17α - diol - 19,20-dione 3-acetate
105. 16α,19 - dimethyl - Δ$^5$ - pregnene - 3β,17α-diol-19,20-dione 3-acetate
106. 16β - methyl - 19 - ethyl - Δ$^5$ - pregnene - 3β,17α-diol-19,20-dione 3-acetate
107. 19 - ethyl - Δ$^5$ - pregnen - 3β - ol - 19,20 - dione acetate Cpd. No.—Continued 108. 16α - methyl - 19 - ethyl - Δ⁵ - pregnen - 3β-ol-19,20- dione acetate
109. 16β - methyl - 19 - ethyl - Δ⁵ - pregnene - 3β-ol-19,20-dione acetate
110. 16α,17α - isopropylidenedioxy - 19 - ethyl - Δ⁵-pregnen-3β-ol-19,20-dione acetate
111. 19 - ethyl - Δ⁵ - pregnene - 3β,17α - diol - 19, 20-dione 3-acetate
112. 16α - methyl - 19 - ethyl - Δ⁵ - pregnene - 3β,17α-diol-19,20-dione 3-acetate

Example 10

The Compound No. 57 was treated in accordance with Example 9, except that acetic anhydride was substituted by propionic anhydride, thus affording 16β,19-dimethyl-Δ⁵ - pregnene - 3β,17α,19 - triol - 20 - one 3,19 - dipropionate (Cpd. No. 113).

Example 11

The Compound No. 29 was successively treated in accordance with Examples 9 and 5, thus affording respectively: the 3-tetrahydropyranylether-19-acetate of 20-cycloethylene - dioxy - 16β,19 - dimethyl - Δ⁵ - pregnene-3-β,17α,19-triol (Cpd. No. 114) and the 19-acetate of 16β, 19 - dimethyl - Δ⁵ - pregnene - 3β,17α, 19 - triol - 20 - one (Cpd. No. 115).

Example 12

To a solution of 5 g. of 19-methyl-Δ⁵-pregnene-3β,17α, 19-triol-20-one (Cpd. No. 62) in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19 - methyl - Δ⁵ - pregnene - 3β,17α,19 - triol-20-one tricaproate (Cpd. No. 116).

Example 13

19 - ethyl - Δ⁵ - pregnene - 3β,17α,19 - triol - 20 - one (Cpd. No. 69) was successively treated in accordance with Examples 12 and 3, thus yielding respectively: 19-ethyl - Δ⁵ - pregnene - 3β,17α,19 - triol - 20 - one tricaproate (Cpd. No. 117) and 19 - ethyl - Δ⁵ - pregnene - 3β, 17α,19 - triol - 20 - one 17 - caproate (Cpd. No. 118).

Example 14

1 g. of 16α,17α-isopropylidenedioxy-19-methyl-Δ⁵-pregnene-3β,19-diol-20-one (Compound No. 61) was heated on the steam bath with 20 cc. of 60% formic acid for 1 hour, cooled, diluted with water and the precipitate was collected, washed with water, dried, and recrystallized from acetone-hexane, thus affording 19-methyl-Δ⁵-pregnene-3β,16α,17α,19-tetrol-20-one (Cpd. No. 119).

Following the same procedure 16α,17α-isopropylidenedioxy-19-methyl-Δ⁵-pregnen-3β-ol-19,20-dione (Cpd. No. 75) was converted into 19-methyl-Δ⁵-pregnene-3β,16α, 17α-triol-19,20-dione (Cpd. No. 120).

Example 15

Compounds Nos. 119 and 120 were treated in accordance with Example 9, yielding respectively: 19-methyl-Δ⁵-pregnene-3β,16α,17α,19-tetrol-20-one 3,16,19-triacetate (Cpd. No. 121) and 19-methyl-Δ⁵-pregnene-3β,16α,17α-triol-19,20-dione 3,16-diacetate (Cpd. No. 122).

Example 16

Compounds Nos. 119 and 120 were treated in accordance with Example 12, thus affording respectively: 19-methyl-Δ⁵-pregnene-3β,16α,17α,19-tetrol-20-one tetracaproate (Cpd. No. 123) and 19-methyl-Δ⁵-pregnene-3β,16α, 17α-triol-19,20-dione tricaproate (Cpd. No. 124).

I claim:
1. A compound of the following formula:

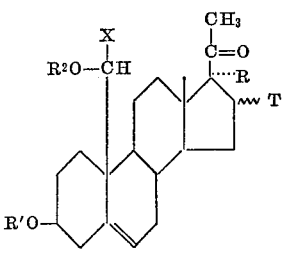

wherein R is selected from the group consisting of hydrogen, hydroxyl, and a hydrocarbon carboxylic acyloxy group of less than 12 carbon atoms; T is a member of the group consisting α-hydroxy, α-hydrocarbon carboxylic acyloxy of less than 12 carbons, α-methyl and β-methyl; T and R together are the group

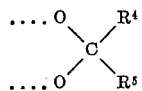

wherein R⁴ and R⁵ are lower alkyl groups; R¹ and R² are selected from the group consisting of hydrogen and a hydrocarbon carboxylic acyl group of less than 12 carbon atoms; and X is a lower alkyl group.

2. 16α,19-dimethyl-Δ⁵-pregnene-3β,19-diol-20-one.
3. 16β,19-dimethyl-Δ⁵-pregnene-3β,19-diol-20-one.
4. 16α,17α-isopropylidenedioxy-19-methyl-Δ⁵-pregnene-3β,19-diol-20-one.
5. 16α,19-dimethyl-Δ⁵-pregnene-3β,17α,19-triol-20-one.
6. A compound of the following formula:

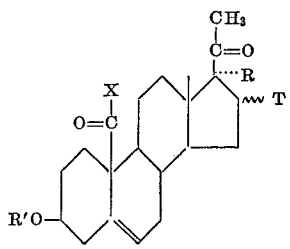

wherein R is selected from the group consisting of hydrogen, hydroxyl and a hydrocarbon carboxylic acyloxy group of less than 12 carbon atoms; T is a member of the group consisting of α-hydroxy, α-hydrocarbon carboxylic acyloxy of less than 12 carbons, α-methyl and β-methyl; T and R together are the group

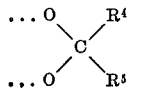

wherein R⁴ and R⁵ are lower alkyl groups; R¹ is selected from the group consisting of hydrogen and a hydrocarbon carboxylic acyl group of less than 12 carbon atoms and X is a lower alkyl group.

7. 16β,19-dimethyl - Δ⁵ - pregnene - 3β,17α - diol-19,20-dione.
8. 16α,19-dimethyl-Δ⁵-pregnen-3β-ol-19,20-dione.

9. 16β,19-dimethyl-Δ⁵-pregnen-3β-ol-19,20-dione.
10. 16α,17α-isopropylidenedioxy-19-methyl-Δ⁵-pregnen-3β-ol-19,20-dione.
11. 16α,19-dimethyl - Δ⁵ - pregnene - 3β,17α-diol-19,20-dione.
12. 16α-methyl-19-ethyl-Δ⁵-pregnen-3β-ol-19,20-dione.
13. 16β-methyl-19-ethyl-Δ⁵-pregnen-3β-ol-19,20-dione.
14. 16α,17α-isopropylidenedioxy-19-ethyl - Δ⁵-pregnen-3β-ol-19,20-dione.

References Cited by the Examiner

UNITED STATES PATENTS

| | | | |
|---|---|---|---|
| 3,067,198 | 12/62 | Wettstein et al. | 260—239.55 |
| 3,077,482 | 2/63 | Wettstein et al. | 260—397.1 |
| 3,087,940 | 4/63 | Rubin | 260—397.4 |

LEWIS GOTTS, *Primary Examiner.*

MORRIS LIEBMAN, *Examiner.*